(12) United States Patent
Flanagan

(10) Patent No.: US 6,221,243 B1
(45) Date of Patent: Apr. 24, 2001

(54) DEVICE FOR REMOVING HYDROCARBONS FROM STORM WATER

(76) Inventor: Terry L. Flanagan, 5477 Westcott Dr., Columbus, OH (US) 43228

( * ) Notice: Subject to any disclaimer, the term of this patent is extended or adjusted under 35 U.S.C. 154(b) by 0 days.

(21) Appl. No.: 09/521,289

(22) Filed: Mar. 8, 2000

(51) Int. Cl.[7] .................................................. C02F 1/28
(52) U.S. Cl. ...................... 210/163; 210/170; 210/232; 210/242.4
(58) Field of Search ..................................... 210/232, 170, 210/122, 460, 163, 164, 242.4, 924, DIG. 9; 404/4

(56) References Cited

U.S. PATENT DOCUMENTS

| | | |
|---|---|---|
| 3,578,585 | 5/1971 | Yahnke . |
| 3,669,275 * | 6/1972 | Downs ................................. 210/460 |
| 3,834,538 | 9/1974 | Laman . |
| 4,110,216 * | 8/1978 | Wagnon et al. ...................... 210/170 |
| 4,832,852 | 5/1989 | Wells et al. . |
| 4,919,820 | 4/1990 | Lafay et al. . |
| 4,919,892 | 4/1990 | Plumb . |
| 4,935,132 | 6/1990 | Schaier . |
| 5,227,072 | 7/1993 | Brinkley . |
| 5,364,535 | 11/1994 | Buckalew . |
| 5,849,198 * | 12/1998 | Sharpless ............................. 210/163 |
| 5,965,030 | 10/1999 | Williams et al. . |
| 6,086,758 * | 7/2000 | Schilling et al. ..................... 210/164 |
| 6,099,723 * | 8/2000 | Morris et al. ...................... 210/242.4 |
| 6,126,817 * | 10/2000 | Duran et al. ......................... 210/154 |

FOREIGN PATENT DOCUMENTS

WO 97/05338 * 2/1997 (WO) .

* cited by examiner

Primary Examiner—David A. Simmons
Assistant Examiner—Frank M. Lawrence
(74) Attorney, Agent, or Firm—Frank H. Foster; Kremblas, Foster, Millard & Pollick

(57) ABSTRACT

A hydrocarbon capturing device includes a retainer that is inserted into the end of an outlet pipe in a storm sewer catch basin. The retainer includes a ring that expands under a bias against the inner surface of the outlet pipe and radially extending fingers mounted to the ring that prevent insertion of the ring into the pipe too far. Two hooks are mounted to the retainer near the upper side of the outlet pipe to fasten one end of a hydrophobic, hydrocarbon-absorbing fabric sheet to the retainer. The opposite end of the sheet extends into the passageway of the outlet pipe, thereby floating atop any water that flows through the pipe during and after a rainfall or snowfall.

15 Claims, 2 Drawing Sheets

DEVICE FOR REMOVING HYDROCARBONS FROM STORM WATER

CROSS-REFERENCES TO RELATED APPLICATIONS

Not Applicable

STATEMENT REGARDING FEDERALLY-SPONSORED RESEARCH AND DEVELOPMENT

Not Applicable

BACKGROUND OF THE INVENTION

1. Field of the Invention

The invention relates generally to storm water capturing systems, and more particularly to a device for removing hydrocarbons from storm water as it exits the catch basin of a storm water capturing system.

2. Description of the Related Art

Precipitation that falls on a surface that cannot absorb it must be directed to a reservoir or a waterway that carries the water away from the surface. This occurs commonly in paved parking lots and streets. Ordinarily the water is directed by gravity into catch basins, which are steel, cast iron, or pre-cast concrete receptacles buried in the ground. The catch basins' openings are at the surface level and are covered by perforated metal covers, through which water can flow into the catch basins, and over which vehicles can drive. Underground pipes connect the catch basins together to direct storm water into a nearby river, stream, or reservoir.

Unfortunately, much of the storm water that washes into storm water systems carries foreign matter with it. This foreign matter can include naturally occurring materials such as soil, sand, branches and leaves. However, it often also includes refined chemicals such as automobile antifreeze, motor oil, fuel and other hydrocarbons that leak from automobiles. Additionally, the very pavement that makes up many road and parking lot surfaces includes hydrocarbons (in the form of asphalt) that leach into storm water.

Hydrocarbons, which float on water, become an environmental concern because they end up in water that is a potential source of drinking water and/or contains wildlife. It is therefore desirable to remove hydrocarbons that are carried by storm water.

Many people have attempted to address this environmental concern by constructing devices for removing hydrocarbons from storm water. U.S. Pat. No. 5,364,535 discloses a fabric that is mounted in a storm sewer catch basin beneath the perforated cover. The fabric absorbs oily pollutants but does not absorb water. However, hydrocarbons in the water coming in through the perforated cover will not be thoroughly removed because the water falls onto the top of the fabric material and prevents it from absorbing the hydrocarbons that float on top of the water.

It is also known conventionally to use filters at the opening of a catch basin. However, such filters often become blocked as larger objects, such as sticks and leaves, are filtered out and eventually obstruct the passage of water through the filter. Such obstruction can cause the storm sewer system to overflow, thereby defeating the purposes of both the storm sewer system and the hydrocarbon removal device.

Therefore, the need exists for a hydrocarbon removal apparatus that is reliable and does not block water flow. This apparatus should be easily accessed from the surface of the parking lot or roadway, and should remove substantially all of the hydrocarbons from storm water.

BRIEF SUMMARY OF THE INVENTION

The invention is an improved storm water capturing system. In storm water capturing systems, water flowing across a surface of ground is captured and directed away from the surface of the ground into a catch basin. The catch basin is mounted with an upper lip beneath the surface of the ground. A catch basin sidewall extends from the upper lip downwardly to a floor beneath the upper lip. The sidewall and floor define a catch basin chamber. An outlet pipe extends through the catch basin sidewall into the catch basin chamber. Thus, the catch basin chamber is disposed in fluid communication with a passageway through the pipe defined by an inner pipe surface, which passageway removes water that flows into the catch basin chamber.

The improvement to the storm water capturing system described above includes a pair of sheet-retaining fasteners, such as hooks, mounted near an upper pipe edge. Furthermore, a hydrophobic, hydrocarbon-absorbing fabric sheet has a first end mounted to the sheet-retaining fasteners, and a second, opposite end extending downstream away from the catch basin chamber into the passageway through the outlet pipe.

An objective of the invention is that as water fills the catch basin chamber and begins to flow through the outlet pipe, the sheet in the outlet pipe floats on top of the flowing water. The water passes beneath the always floating sheet thereby allowing the sheet to absorb hydrocarbons floating on the water.

The direction of water flow maintains the sheet extending downstream from the sheet-retaining hooks away from the catch basin chamber into the outlet pipe. The orientation of the sheet, and the structure retaining it at only one end, prevent the invention from causing any overflow of the water falling into the catch basin. The sheet cannot become clogged with debris, but even if some debris becomes lodged in the sheet, the sheet does not block water flow, because water is not forced through it. The water's upper surface merely flows against the lower surface of the floating sheet.

Figure 1:
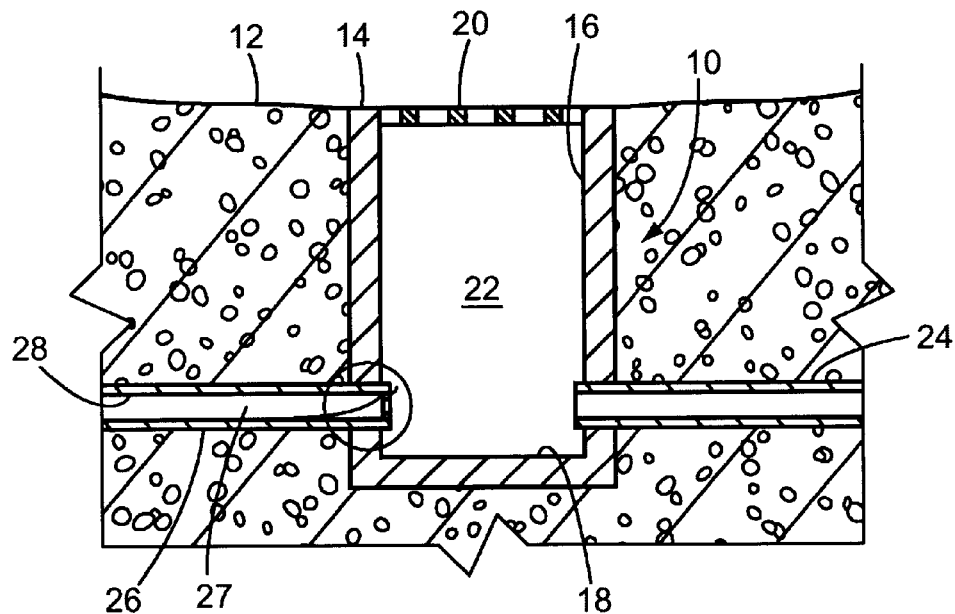
FIG. 1 is a side view in section illustrating the preferred embodiment of the present invention in its operable position.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the word connected or terms similar thereto are often used. They are not limited to direct connection but include connection through other elements where such connection is recognized as being equivalent by those skilled in the art.

DETAILED DESCRIPTION OF THE INVENTION

FIG. 1 shows a conventional storm sewer catch basin 10 in its operable position buried underground with the ground surface 12 sloped toward the lip 14. The ground surface is a conventional asphalt pavement, but could alternatively be gravel, concrete or some other conventional material. The catch basin sidewall 16 extends downwardly from the lip 14 to the floor 18. A conventional perforated metal grate 20 covers the catch basin chamber 22 defined by the grate 20, the sidewall 16 and the floor 18, permitting vehicles driven across the surface 12 to pass over the catch basin.

An inlet pipe 24 and an outlet pipe 26 extend through opposite sides of the sidewall 16 into the catch basin chamber 22. The invention also works with an alternative inlet and outlet pipe configuration in which a single pipe extends from one side of the catch basin chamber to the other, and the top of the pipe in the catch basin is cut out to permit water to enter the pipe. The side of the pipe directing water out of the catch basin is considered the outlet pipe in such a configuration. However, this pipe configuration is primarily found in older construction and is not common in newer sewer systems.

The passageway 27 through the outlet pipe 26 is defined by the outlet pipe's inner cylindrical surface 28. The passageway 27 is in fluid communication with the catch basin chamber 22. This means that fluids, such as liquids and gases, can flow between the catch basin chamber 22 and the passageway 27.

The inlet pipe 24 is ordinarily connected to another catch basin for which its opposite end is an outlet pipe. There may be many other catch basins arranged in series with the catch basin 10, or alternatively, there could be a hub-and-spokes configuration of catch basins and pipes in which several catch basins empty into one primary catch basin, which then directs the water elsewhere. Therefore, water flowing into an upstream catch basin is conveyed to the catch basin 10 by flowing from a distal end (not shown) of the pipe 24 to the end shown in FIG. 1 that empties into the catch basin 10.

Figure 2:
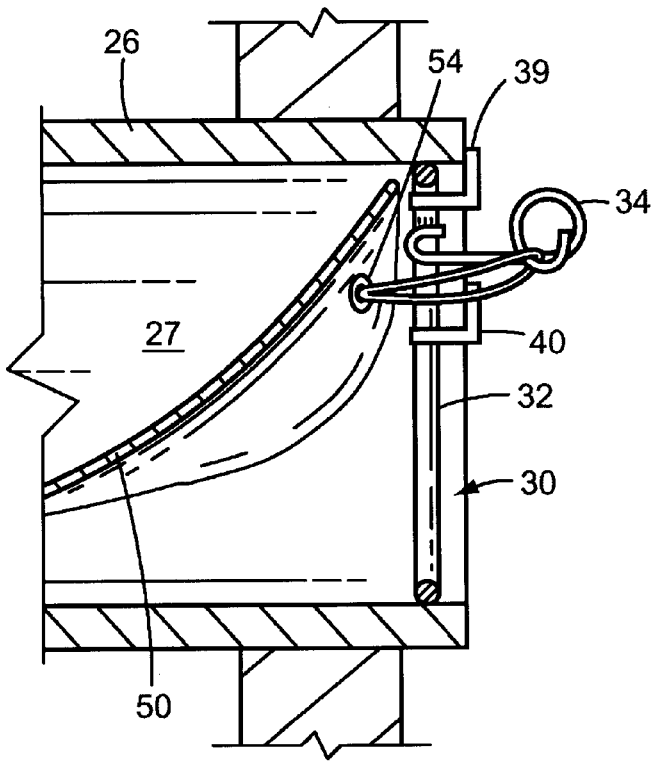
FIG. 2 is an enlarged side view in section through the line 2—2 of FIG. 3 illustrating the preferred embodiment of the present invention in the outlet pipe of FIG. 1.

As is shown in FIG. 1 by the encircled region, and in FIG. 2, which is a more magnified view of the encircled region, the hydrocarbon removal structure is mounted in the outlet pipe 26. The hydrocarbon removal structure includes, in the preferred embodiment, a retainer 30 that includes a ring 32, shown in FIGS. 2 and 3. The ring 32 is preferably steel wire, rod or some other material including composites, such as fiberglass.

Figure 3:
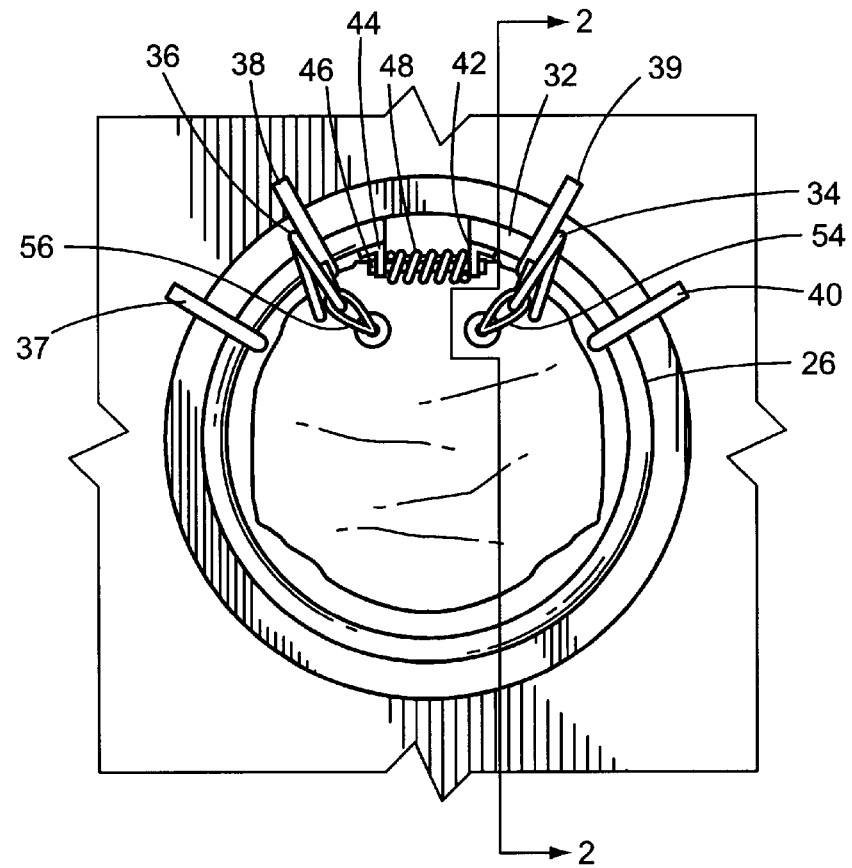
FIG. 3 is an end view in section illustrating the preferred embodiment of the present invention.

Referring to FIG. 3, the ring 32 has first and second ears 42 and 44, and a bolt 46 extending from an aperture in one ear through an aperture in the other. An outwardly biased coil spring 48 extends between the ears 42 and 44 with the bolt 46 extending coaxially through the passageway of the spring 48. The outwardly biased spring 48 exerts a force against the ears 42 and 44, which is transmitted therethrough to the ends of the ring 32, forcing the outer peripheral edge of the ring against the inner surface of the outlet pipe 26.

Radially extending fingers 37, 38, 39 and 40 extend from the ring 32. These fingers seat against the terminal end of the outlet pipe 26, or the inner surface of the sidewall 16, preventing the ring 32 from being forced into the passageway 27 beyond a predetermined point as shown near the outlet pipe end. It is preferred that the fingers be positioned sufficiently above the spring line or centerline of the outlet pipe in case the ring 32 is used with the alternative pipe configuration described above.

A pair of twisted hooks 34 and 36 extend from the ring 32 near the upper edge of the outlet pipe 26. The hooks provide a fastening means for a sheet 50 to attach to the retainer 30 and prevent the sheet from becoming unfastened, for example in the event of a backflow. The sheet must absorb hydrocarbons but not water, and is preferably a hydrophobic meltblown polypropylene available from the New Pig Corporation, 1 Pork Avenue Tipton, Pa., 16684-0304. The sheet 50 has a pair of preferably flexible loops 54 and 56, for example made of nylon rope, mounted through grommets attached to the end of the sheet through which the hooks 34 and 36 extend. The hooks retain the loops, and therefore the end of the sheet 50, near the outlet pipe opening, and the opposite end of the sheet 50 extends freely downstream into the passageway 27.

Figure 4:
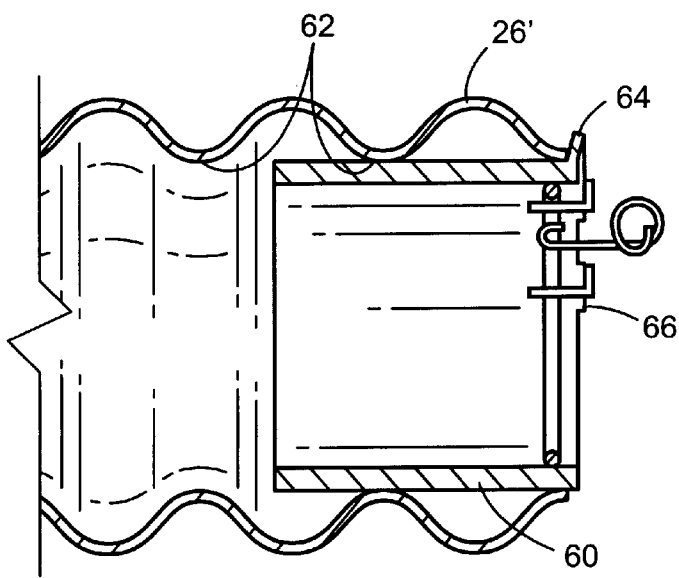
FIG. 4 is a side view in section illustrating the corrugated pipe adapter.

If the retainer 30 is desired to be positioned in a corrugated outlet pipe 26' as shown in FIG. 4, an adapter 60 is required. This is because in some corrugated pipes the helical lands 62 and grooves between the lands 62 distort the retainer 30. In all corrugated pipes, there is the difficulty of creating a retainer that fits at the predetermined distance from the end of the pipe and has the appropriate diameter for the pipe at that position. The adapter 60 is preferably made of rolled sheet metal that is bent into a circular shape to fit within the outlet pipe 26' and, preferably, create an outward bias.

The outer surface of the adapter 60 seats against and spans across the lands 62, providing an inner surface that the retainer 30 seats against without distortion. The adapter 60 preferably stays in place by its own spring force exerted against the inner surface of the corrugated pipe. However, the retainer 30 can maintain the adapter in place. The adapter fingers 64 and 66 and two other fingers (not shown), which are behind the retainer's fingers, prevent the adapter 60 from extending too far into the outlet pipe 62'.

Once the retainer 30 is in position at the end of the outlet pipe 26, with or without the adapter 60, the loops on the end of the sheet 50 are mounted to the hooks 34 and 36. The downstream end of the sheet is folded under the upstream end and placed entirely in the passageway 27 of the outlet pipe 26. When water fills the catch basin chamber 22 and begins to flow through the outlet pipe 26, the flowing water causes the sheet to unfold and extends downstream into the passageway, aligning it with the outlet pipe 26. Any hydrocarbons floating on top of the water flow against the underside of the sheet 50 that floats on top of the water, and are absorbed and/or adsorbed by the sheet 50. Once the sheet is sufficiently saturated with hydrocarbons it is removed and cleaned or disposed of. The sheet is replaced with a clean sheet that is similar.

One could alternatively construct an outlet pipe with hooks mounted to it for retaining the sheet 50 rather than installing a separate retainer in the outlet pipe as with the preferred embodiment. One could alternatively place metal hooks in the cement of the catch basin when it is being cast rather than attaching them to the outlet pipe or the retainer. In principle, such hooks could be mounted anywhere near the outlet pipe opening so that the sheet could be attached and extended into the outlet pipe.

When water starts to flow, the sheet 50 must unfold completely. The sheet 50 must not impede the flow of water through the outlet pipe 26. This is why it is important that the end of the sheet 50 mounts at the upper edge of the outlet pipe 26 and the opposite end of the sheet 50 extends freely into the passageway 27, because it is undesirable for water to flow over the sheet 50. The leading edge of the sheet 50 must stay above the surface of the water, because only then will hydrocarbons on the upper surface of the water be absorbed and/or adsorbed by the sheet 50.

The sheet 50 must be long enough to extend from the upper edge of the outlet pipe to the bottom of the pipe and extend into the outlet pipe with approximately six feet of the sheet along the bottom surface of the pipe. This is to ensure that a sufficient, minimal length of sheet contacts the upper surface of water in the pipe to absorb hydrocarbons. Pipes can range in diameter from eight inches to eight feet, but most are in the lower end of the range. There is also a relationship between the length of time it takes to saturate the sheet with hydrocarbons and the surface area of the sheet 50. When the pipe has a greater diameter, the width of the fabric increases, thereby increasing overall surface area. Therefore, it is preferred that the sheet 50 be substantially the width of the pipe's diameter and a length sufficient to permit about at least six feet of the sheet's length to contact the lower surface of the outlet pipe. It is, of course, possible that in some circumstances the sheet 50 will have a length greater than about six feet in contact with the pipe bottom, for example when it will be used where saturation will occur very rapidly otherwise.

It is possible that the outlet pipe 26 will fill with water under extremely heavy rain. Little or no hydrocarbons will be collected under such conditions because the sheet 50 is pressed against the top of the outlet pipe and the flow of water is too turbulent to permit all of the hydrocarbons to float to the top of the pipe. However, because most of the hydrocarbons are washed into the storm water at the beginning of a rain, and because it takes a significant amount of time for enough rain to wash into the storm sewer system to completely fill the outlet pipe, this will have little effect on the function of the invention.

When the sheet is saturated with hydrocarbons, it can be discarded or wrung out and reused many times. However, when sand or other grit get on the sheet it may reduce its useful life. Under ordinary conditions, the sheet should be checked after each rain.

It is most desirable to be able to remove and install the sheet 50 from the top opening of the catch basin 10. There is ordinarily a space of 12 to 36 inches from the lip 14 to the outlet pipe 26. Under such conditions a person could possibly reach down by hand and remove an old sheet and attach a new one. Alternatively, one could use a pole with a hook on the end to lower and raise the sheet from above the catch basin. By using the pole to attach the sheet, one can maintain the invention without worrying about enclosed space requirements established by governmental regulatory agencies.

The invention may be modified to permit it to be used in an exceptional situation. In this situation, a manhole opening into a catch basin or other storm sewer system may be smaller than the diameter of the outlet pipe to which a retainer is going to be attached. Thus, the ring of the retainer may be larger than the manhole opening through which the ring must be passed. Therefore, the ring is split in this situation to permit it to be collapsed so it can be taken down in two pieces and reassembled. In the preferred structure for such a situation, the ring is split and a sleeve is attached to a part of the ring. When the ring is to be reassembled within the manhole, one end of the ring is slipped into the sleeve. The force of the ring expanding against the inner wall of the outlet pipe holds the separate pieces of the ring together.

While certain preferred embodiments of the present invention have been disclosed in detail, it is to be understood that various modifications may be adopted without departing from the spirit of the invention or scope of the following claims.

What is claimed is:

1. A hydrocarbon capturing apparatus for use in a storm water sewer system which receives water flowing across a surface of ground in at least one catch basin that is mounted with an upper lip beneath the surface of the ground and a sidewall extending from the upper lip to a floor beneath the upper lip, the sidewall and floor defining a catch basin chamber, and the storm water sewer system further including an outlet pipe extending through the catch basin sidewall into the catch basin chamber, thereby disposing the catch basin chamber in fluid communication with a passageway through the outlet pipe defined by an inner pipe surface for removing water that flows into the catch basin chamber, the outlet pipe having an upper pipe edge that is above a lower pipe edge, the hydrocarbon capturing apparatus comprising:

(a) a hydrophobic, hydrocarbon-absorbing fabric sheet having a first end for mounting near the upper pipe edge, and a second, opposite end for extending away from the catch basin chamber into the passageway through the outlet pipe; and (b) at least one sheet-retaining fastener for mounting near the upper pipe edge for removably mounting the sheet thereto.

2. A hydrocarbon capturing apparatus in accordance with claim 1, wherein the sheet is substantially as wide as the passageway through the outlet pipe.

3. A hydrocarbon capturing apparatus in accordance with claim 1, further comprising a retainer having a ring with an outer peripheral surface that is biased outwardly for seating against the inner pipe surface, and said sheet-retaining fastener mounted at a peripheral ring edge for mounting near the upper pipe edge and removably attaching the sheet to the fastener.

4. A hydrocarbon capturing apparatus in accordance with claim 3, further comprising at least one radially extending finger mounted to the ring for preventing the ring from being forced into the passageway of the outlet pipe beyond a predetermined distance.

5. A hydrocarbon capturing apparatus in accordance with claim 1, further comprising a retainer having a ring with an outer peripheral surface that is biased outwardly for seating against the inner pipe surface, two spaced sheet-retaining hooks mounted at a peripheral ring edge for mounting near the upper pipe edge and removably attaching the sheet to the hooks, and the ring including at least two spaced, radially extending fingers mounted to the ring for preventing the ring from being forced into the passageway of the outlet pipe beyond a predetermined distance.

6. A hydrocarbon capturing apparatus in accordance with claim 5, wherein the sheet is substantially as wide as the passageway through the outlet pipe.

7. A hydrocarbon capturing apparatus in accordance with claim 6, further comprising a corrugated pipe adapter including an adapter ring with an outer peripheral surface for spanning across circumferential lands on a corrugated outlet pipe, and an inner surface for receiving the outer peripheral surface of the retainer ring, said adapter also including at least two spaced, radially extending fingers mounted to the outer surface of the adapter ring for preventing the adapter from being forced into the passageway of the outlet pipe beyond a predetermined distance.

8. An improved storm water capturing system in which water flowing across a surface of ground is captured and directed away from the surface of the ground into a catch basin mounted with an upper lip beneath the surface of the ground and a catch basin sidewall extending from the upper lip to a floor beneath the upper lip, said sidewall and floor defining a catch basin chamber, and an outlet pipe extending through the catch basin sidewall into the catch basin chamber, thereby disposing the chamber of the catch basin in fluid communication with a passageway through the pipe defined by an inner pipe surface for removing water that flows into the catch basin chamber, said outlet pipe having an upper pipe edge that is above a lower pipe edge, the improvement comprising:

(a) at least one sheet-retaining fastener mounted near the upper pipe edge; and (b) a hydrophobic, hydrocarbon-absorbing fabric sheet having a first end mounted to the sheet-retaining fastener, and a second, opposite end extending away from the catch basin chamber into the passageway through the outlet pipe.

9. An improved storm water capturing system in accordance with claim 8, wherein the sheet is substantially as wide as the passageway through the outlet pipe in which the sheet is mounted.

10. An improved storm water capturing system in accordance with claim 8, further comprising a retainer having a ring with an outer peripheral surface that is biased outwardly against the inner pipe surface, and at least one sheet-retaining fastener mounted at a peripheral ring edge near the upper pipe edge, said sheet being mounted to said sheet-retaining fastener.

11. An improved storm water capturing system in accordance with claim 10, further comprising at least one radially extending finger mounted to the ring for preventing the ring from being forced into the passageway of the outlet pipe beyond a predetermined distance.

12. An improved storm water capturing system in accordance with claim 8, further comprising a retainer having a ring with an outer peripheral surface that is biased outwardly against the inner pipe surface, two spaced sheet-retaining hooks mounted at a peripheral ring edge, said hooks being mounted near the upper pipe edge and removably mounting the sheet to the hooks, and the ring including at least two spaced, radially extending fingers mounted to the ring for preventing the ring from being forced into the passageway of the outlet pipe beyond a predetermined distance.

13. An improved storm water capturing system in accordance with claim 12, wherein the sheet is substantially as wide as the passageway through the outlet pipe in which the sheet is mounted.

14. An improved storm water capturing system in accordance with claim 13, further comprising a corrugated pipe adapter including an adapter ring with an outer peripheral surface seated against circumferential lands on an inner surface of a corrugated outlet pipe, and an inner adapter surface receiving the outer peripheral surface of the retainer ring, said adapter also including at least two spaced, radially extending fingers mounted to the outer surface of the adapter ring for preventing the adapter from being forced into the passageway of the outlet pipe beyond a predetermined distance.

15. An improved storm water capturing system in accordance with claim 13, wherein the sheet is sufficiently long to extend from the sheet-retaining hooks downwardly to the inner pipe surface and extend at least about six feet along the inner pipe surface.

* * * * *